June 20, 1967 S. DARLINGTON 3,327,233

REACTIVE ELEMENT AMPLIFIERS

Filed April 10, 1963 3 Sheets-Sheet 1

INVENTOR
S. DARLINGTON
BY G. E. Kersey
ATTORNEY

June 20, 1967 S. DARLINGTON 3,327,233

REACTIVE ELEMENT AMPLIFIERS

Filed April 10, 1963

3 Sheets-Sheet 2

June 20, 1967 S. DARLINGTON 3,327,233
REACTIVE ELEMENT AMPLIFIERS
Filed April 10, 1963 3 Sheets-Sheet 3

United States Patent Office 3,327,233
Patented June 20, 1967

3,327,233
REACTIVE ELEMENT AMPLIFIERS
Sidney Darlington, Passaic Township, Morris County, N.J., assignor to Bell Telephone Laboratories Incorporated, New York, N.Y., a corporation of New York
Filed Apr. 10, 1963, Ser. No. 272,017
7 Claims. (Cl. 330—7)

This invention deals with amplification, particularly by circuits employing reactive elements.

Reactive elements have been of fundamental significance in the processing of signals. They have met with much success in achieving amplification and modulation. However, at low frequencies, amplification by reactive elements is typically subject to substantial signal drift. And as applied at high frequencies to the regeneration of pulse signals, the elements have been characterized by a limited response capability.

Accordingly, it is an object of the invention to facilitate amplification by reactive elements. Particular objects are the achievement of drift stabilization and high speed pulse regeneration.

In accomplishing the foregoing and related objects, the invention provides for energizing and deenergizing at least one reactive element by way of distinctive paths respectively incorporating variable impedance elements. A variable impedance element is one presenting a non-constant impedance magnitude at its external terminals during its operating cycle. Such an element is to be distinguished from one that is merely adjustable. The latter has a fixed setting that is subject to alteration, but not spontaneously. A variable impedance element may be controlled by the signal passing through it or by an auxiliary source. When controlled by the signal, the elements are non-linear. When controlled by an auxiliary source, the elements are said to be time-variable and may be realized using balanced modulator techniques.

To provide power gain, the reactive elements may also be time-variable. In addition, the allocation of gain between current and voltage is altered by energizing the reactive elements in shunt or in series and by de-energizing them in a complementary connection.

In a representative reactive element amplifier, a time-variable capacitor is alternatively energized and de-energized through respective time-variable resistors. The latter operate alternatively and are phased so that a low impedence condition of one is associated with a high impedance condition of another. This allows a non-reciprocal transfer of a signal from a source to a load. The level of the transferred signal is controlled by the time-variations of the capacitor. Since the time-variations of all elements are brought about using balanced modulator techiques, there is no residual signal at a load in the absence of an applied input and the amplifier is thus stabilized against drift.

According to another aspect of the invention, the representative amplifier is adaptable to high frequency pulse regeneration. Where the pulse signals are unipolar, the time-variable resistors are advantageously replaced by rectifying diodes and a blocking signal source. One of the diodes prevents the capacitor from discharging into its source during output intervals. The other, acting in conjunction with the blocking source, provides a low impedance during each output interval and a high impedance otherwise.

Other aspects of the invention will become apparent after considering several illustrative embodiments taken in conjunction with the drawings in which.

Figure 1A:
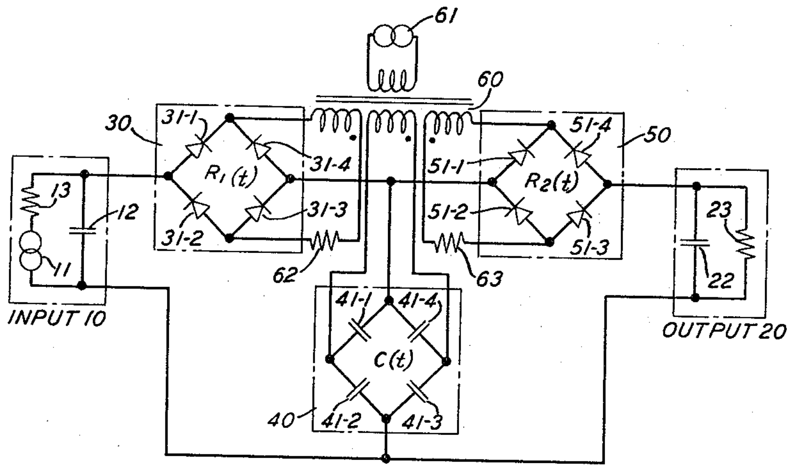
FIG. 1A is a schematic diagram of an amplifier exhibiting voltage gain.
Figures 1B, 2B:
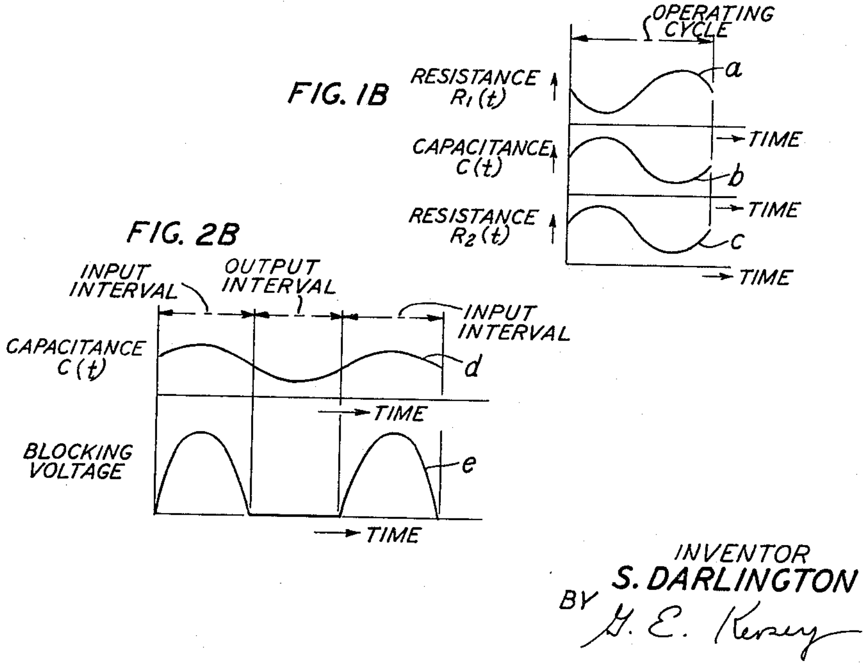
FIG. 1B is a set of graphs applicable to the amplifier of FIG. 1A.
FIG. 2B is a set of graphs applicable to the regenerator of FIG. 2A.

In the amplifier of FIG. 1A, an input 10, containing a source 11, is coupled to an output 20, through a network of time-variable impedance elements 30, 40 and 50. The network is a T-pad whose series arms contain time-variable resistors 30 and 50 and whose shunt arm contains a time-variable capacitor 40. Both the input and the output include smoothing capacitors 12 and 22 as well as respective source and load resistors 13 and 23. During the operating cycle of the amplifier, the resistance and capacitance magnitudes of the time-variable elements 30, 40 and 50 vary between relatively high and relatively low levels. Representative variations $R_1(t)$, $C(t)$ and $R_2(t)$ for elements 30, 40 and 50 are given by respective graphs *a*, *b* and *c* in FIG. 1B.

Illustratively, the variations $R_1(t)$, $C(t)$ and $R_2(t)$ are realized using balanced bridges whose arms contain substantially identical non-linear components. The bridges of resistors 30 and 50 employ non-linear rectifying diodes 31–1 through 31–4 and 51–1 through 51–4; the bridge of the capacitor 40 employs non-linear capacitors 41–1 through 41–4.

Figure 4:
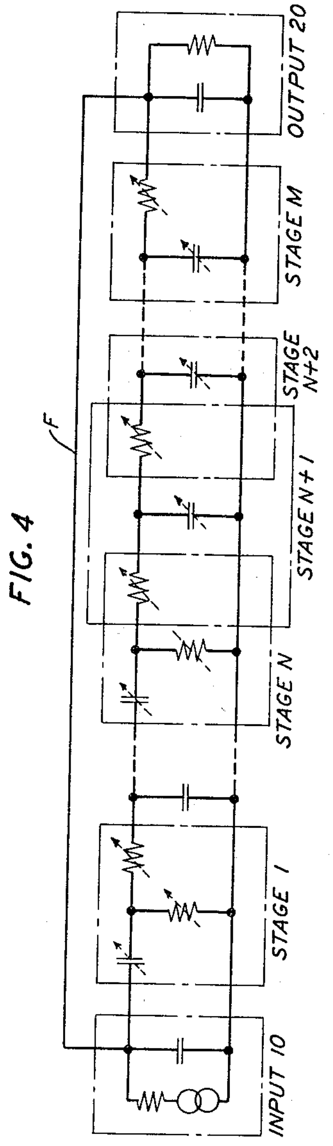
FIG. 4 is a schematic diagram of a multistage amplifier exhibiting current and voltage gain.

Suitable non-linear capacitors 41–1 through 41–4 are provided by well known p-n or n-p junction semiconductor devices. For example, the silicon varacter exhibits an increasing capacitance during transitions from its reversed-biased condition to its forward-biased condition. A similar capacitance variation is exhibited by the epitaxial gallium-arsenide varactor disclosed in the Sixth Interim Report on Microwave Solid-State Devices, Contract DA 36–039 sc–85325 in FIGURE 4 of Chapter 2 at page 13. In the case of a varactor, the equilibrium operating point can be adjusted in conventional fashion by employing a separate, back-biasing source. Still other appropriate non-linear capacitors are of the kind employed by M. Green in the bridge amplifier of U.S. Patent 2,850,585.

The bridges in FIG. 1A are energized through a transformer 60 from a control source 61 whose operating frequency is desirably substantially higher than that of the input source 11. In general, the frequency of the control source should be at least twice that of any input signal component. Thus, representations of the input signal are applied to the time variable capacitor 40 at least twice during each cycle of the highest frequency component in the input signal. These representations are increased in amplitude as discussed below and delivered to the output during the next half cycle of the control source. There is therefore sufficient information contained in the signal delivered to the output to recover the amplified version of the input signal upon smoothing. The energizing paths of the resistive bridges include current limiting resistors 62 and 63.

Since the bridges are balanced and their control signals are applied at internal terminals, there is no external signal level attributable to the control source 61. However, changes in the control levels are accompanied by altered operating points which give rise to an external impedance characteristic that is time-variable. The actual impedance encountered by input signals depends on the degree to which the control signals tend to forward bias or reverse bias the diodes in the bridge. This general technique is explained in some detail in Chance et al., Waveforms, vol. 19 of the MIT Radiation Laboratory Series, McGraw-Hill, New York, 1949, Chapter 11.

The windings of the transformer 60, as evidenced by the dot markings in FIG. 1A, are arranged so that the time-variable resistors 30 and 50 operate in phase opposition. As a result, one of the resistors is in a high impedance condition when the other is in a low impedance condition. In addition, because of its transformer windings, the time-variable capacitor is operated so that it is in a high capacitance condition when the first time-variable resistor is in its low impedance condition. During the interval that the first resistor 30 is in its low impedance condition, that time-variable capacitor 40 is charged from the input. Subsequently, the conditions of the two time-variable resistors are interchanged and the control source 45 of the time-variable capacitor causes a reduction in the net bridge capacitance. The attendant voltage increase appears directly at the output because of the low impedance condition of the second time-variable resistor 50, but is isolated from the input because of the high impedance condition of the first time-variable resistor 30.

In terms of amplification, the circuit of FIG. 1A exhibits a voltage gain which is substantially the ratio of the maximum capacitance to the minimum capacitance exhibited by the time-variable capacitor 40 during its cycle of operation.

Figure 2A:
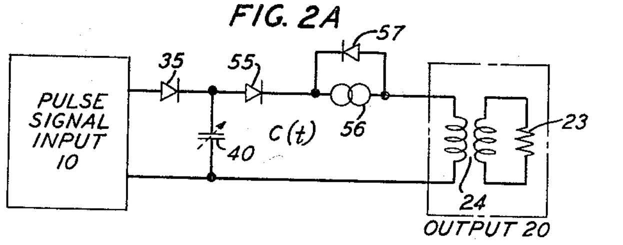
FIG. 2A is a schematic diagram of a pulse signal regenerator adapted from the amplifier of FIG. 1A.

To adapt the circuit of FIG. 1A to the high frequency regeneration of unipolar pulse signals, the time-variable resistors 30 and 50 are advantageously replaced by variable impedance diodes 35 and 55, as shown in FIG. 2A. The second variable impedance diode is accompanied by a blocking signal source 56, and the time-variable capacitor 40 is symbolized with a dashed-line arrow to indicate that its capacitance magnitude is variable rather than merely adjustable.

Each pulse signal to be regenerated has an input interval and an output interval. Of course, during some input intervals, there will be no applied pulse signal. As shown in graph *d* of FIG. 2B, the capacitance variations are at a high level during the input intervals and at a low level during the output intervals. The voltage at the terminals of the blocking source 56 follows a pattern similar to that of the capacitance variations. As shown in graph *e* of FIG. 2B, the blocking voltage reaches a high level during input intervals and, because of a by-pass diode 57, a substantially zero level otherwise.

When an input pulse signal is applied to the time-variable capacitor 40, a subsequent decrease in the time-variable capacitance causes the voltage of the capacitor to rise above the input level. This increased voltage is prevented from having any effect at the input because of the first variable impedance diode 35, but it appears at the output in dependence upon the condition of the blocking current source 56. As long as the blocking source back-biases its associated diode 57, there is no change in the output. But when the blocking source diode is forward-biased, there is a low impedance path through the diode and the increased voltage level of the time-variable capacitance 40 is directly applied to the output 20. The latter may include a pulse transformer 24 to give current gain as well as voltage gain.

Figure 3:
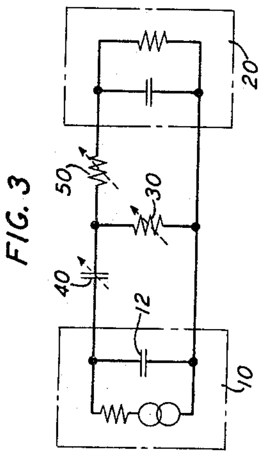
FIG. 3 is a schematic diagram of an amplifier exhibiting current gain.

A further adaptation of the invention given in FIG. 3 is obtained by interchanging the time-variable capacitor 40 and the first time-variable resistor 30 of FIG. 1A. Because of the interchange, the circuit of FIG. 3, unlike that of FIG. 1A, provides current again, and its output is reversed in phase. This comes about because of the way that the time-variable capacitor 40 is connected to the smoothing capacitor 12 of the input. Because of the connection, each increment of charge supplied to the output 20 during an operating cycle results in a return increment of charge to the input smoothing capacitor 12. Thus the only charge removed from the input smoothing capacitor 12 is the initial charge on the time-variable capacitor 40. The charge supplied to the output 20 stems from the energy used to bring about time-variations of the capacitor 40 with the result that the circuit provides current gain. There is voltage gain as well for maximum-minimum capacitance variations greater than two to one.

For increased gain, single stages of the type shown in FIG. 3 with series time-variable capacitors may be cascaded directly. Where the capacitance variations in the cascaded stages are insufficient to provide voltage gain, the stages may be combined with those of the type shown in FIG. 1A having shunt time-variable capacitors. One such combination, with an odd number N of initial stages of current gain and remaining stages M–N of voltage gain, is the ladder network of FIG. 4. Adjoining interstage elements of like kind have been coalesced and a feedback loop F has been introduced to stabilize the overall gain of the cascaded stages 1 through M. The feedback is negative because each stage 1 through N with a series capacitor has a phase reversal and there is an odd number of stages. Where an even number of stages with series capacitors is cascaded (not shown), the phase reversals cancel, permitting positive feedback. In addition, for capacitance variations in series-capacitor stages greater than two to one, there can be both current and voltage gain. Consequently, positive feedback over the two stages can lead to sustained oscillations that are stabilized in frequency.

Figure 5:
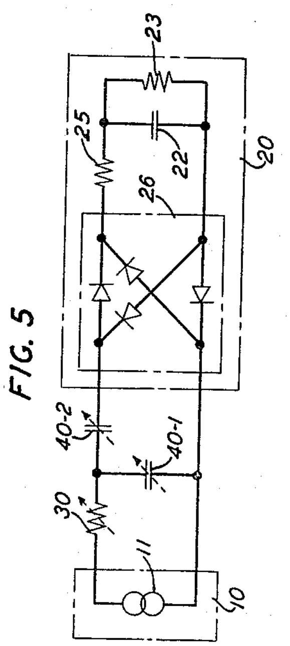
FIG. 5 is a schematic diagram of an amplifier exhibiting both current and voltage gain.

A further embodiment of the invention set forth in FIG. 5 provides current and voltage gain in a single stage. Shunt and series time-variable capacitors 40–1 and 40–2 are employed in conjunction with a series time-variable resistors 30, and a full-wave rectifier 26 is included in the output 20. The capacitors are operated to have a large capacitive sum when the time-variable resistor 30 is in its low impedance condition, and a small capacitive sum for the high impedance condition. As a result, the capacitors 40–1 and 40–2 are charged in parallel to a higher average voltage than that of the source 11. This results in voltage gain. At the same time the capacitive difference is made to fluctuate widely so that charges flow back and forth through the rectifier 26, even in the absence of further charge from the source 11. This gives current gain. The operating condition of the capacitors 40–1 and 40–2 is readily met by subjecting them to non-sinusoidal fluctuations.

Figure 6:
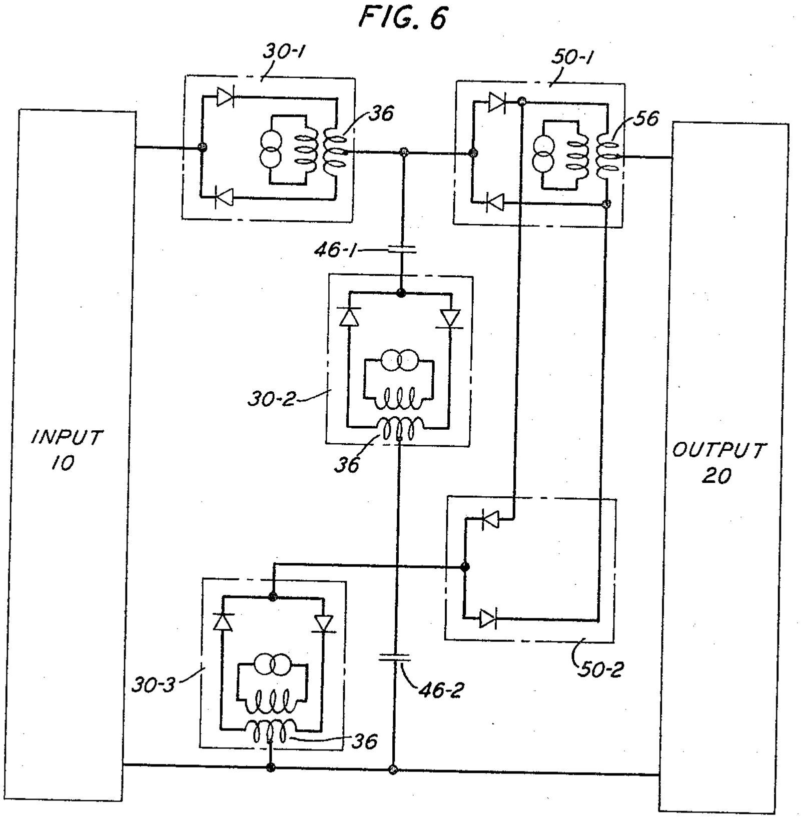
FIG. 6 is a schematic diagram of a capacitor transformer.

The principle of energizing reactive elements in one connection and de-energizing them in another is readily applicable to the capacitor transformer of FIG. 6. Unlike ordinary transformers, one employing capacitors applies even to direct currents. As shown in FIG. 6, two capacitors 46–1 and 46–2 are controlled by five time-variable resistors 30–1 through 30–3 and 50–1 through 50–2. The capacitors 46–1 and 46–2 are connected in series across the input 10 and then disconnected, after which they are reconnected in parallel across the output 20. To reinitiate the operating cycle, the capacitors 46–1 and 46–2 are disconnected and reconnected in series across the input 10. As the cycle is repeated, charge is continually transferred between the input 10 and output 20.

For the time-variable resistors 30–1 through 30–3 and 50–1 through 50–2 of FIG. 5, balanced modulator techniques similar to those of FIG. 1 are applied except that two diodes in each bridge have been replaced by a center tapped transformer winding 36 or 56. Where the time-variable resistors operate concurrently, they can be energized from the same source as shown for the two output connected time-variable resistors 50–1 and 50–2.

When the capacitors 46–1 and 46–2 have equal and constant capacitances, the switching action from series to parallel halves their voltages and doubles their charges. Thus at a low frequency, relative to the switching frequency, the output voltage approaches half of the input voltage, but there is a doubling of charge providing a transformation current ratio of two to one. By interchanging the series and parallel connections, there is a doubling of the voltage and a halving of the charge providing a voltage transformation ratio of two to one.

Figure 7:
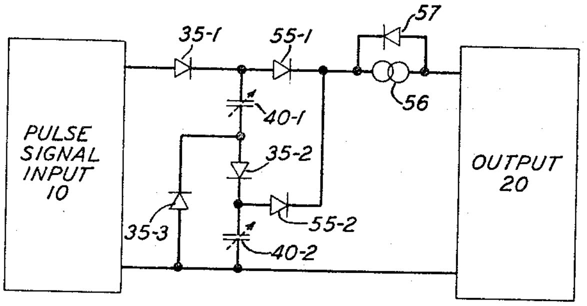
FIG. 7 is a schematic diagram of a high-speed pulse regenerator adapted from the transformer of FIG. 6.

With time-variable capacitors 40–1 and 40–2 as shown in FIG. 7 the circuit of FIG. 6 is adaptable as a high frequency pulse regenerator similar to that of FIG. 2A. For unipolar pulse signals, the time-variable resistors are replaced by non-linear rectifying diodes 35–1 through 35–3 and 55–1 through 55–2. Additionally included is a blocking source 56 comparable to that of FIG. 2A. Although there is no direct provision for amplitude stabilization in the circuit of FIG. 7, incidental non-linear effects are generally sufficient for that purpose. When they prove insufficient, a biased diode or its equivalent can be added to the output 20.

As long as the power supplied for pulse regeneration is derived solely from the time-variable capacitors, the gain obtainable is sufficient to operate logic circuits. Where it is desired to use the regenerator in a transmission system, more amplification is obtanable by using it with the amplifiers described earlier.

Other adaptions of the invention will occur to those skilled in the art.

What is claimed is:

1. A circuit for amplifying an electrical signal comprising (A) control means independent of said signal, (B) a two-terminal time-varying capacitance device the capacitance of which periodically alternates between relatively high values of capacitance and relatively low values of capacitance in response to said control means, (C) a first two-terminal time-varying resistance device the resistance of which periodically alternates between relatively low values and relatively high values in response to said control means, said relatively low values of resistance existing while said capacitor device assumes said relatively high values of capacitance and said relatively high values of resistance existing while said capacitance device assumes said relatively low values of capacitance, (D) a second two-terminal time-varying resistance device the resistance of which periodically alternates in response to said control means between relatively low values and relatively high values at the same rate as, but in phase opposition to, said first time-varying resistance device, (E) an input terminal, (F) an output terminal, (G) a common terminal, (H) means for applying said signal across said input terminal and said common terminal, (I) means for connecting said first time-varying resistance device and said time-varying capacitance device in series across said input terminal and common terminal, (J) means for connecting one terminal of said second time-varying resistance device to said output terminal, (K) means for connecting the remaining terminal of said second time-varying resistance device to the junction of said time-varying capacitance device and said first-time varying resistance device.

2. The circuit of claim 1 wherein said first and second time-varying resistance devices each comprises a diode and said control means comprises a periodic time-varying biasing source connected in shunt with each of said diodes, each of said biasing sources providing a signal out-of-phase with that provided by the other biasing source to periodically back-bias its corresponding diode to a greater or lesser degree.

3. The circuit of claim 1 wherein (A) said control means comprises a transformer having a single independently energized primary winding and three secondary windings, two of said secondary windings having a common sense and the remaining secondary winding having the opposite sense, (B) said first and second time-varying resistance devices each comprises a bridge circuit having diodes in each arm and having one opposite pair of nodes connected to corresponding secondary windings having opposite sense for the two diode bridges, the remaining pair of opposite nodes of each diode bridge being the terminals of the respective time-varying resistance devices, and (C) said time-varying capacitance device comprises a bridge circuit having non-linear capacitive elements in each arm and having one pair of opposite nodes connected to the remaining secondary winding, the remaining pair of opposite nodes of said capacitor bridge being the terminals of said time-varying capacitance device.

4. A multistage circuit for amplifying an electrical signal formed by interconnecting a plurality of stages each comprising, (A) control means independent of said signal, (B) a time-varying capacitance device the capacitance of which periodically alternates between relatively high values of capacitance and relatively low values of capacitance in response to said control means, (C) a first two-terminal time-varying resistance device the resistance of which periodically alternates between relatively low values and relatively high values in response to said control means, said relatively low values of resistance existing while said capacitance device assumes said relatively high values of capacitance and said relatively high values of resistance existing while said capacitance device assumes said relatively low values of capacitance, (D) a second two-terminal time-varying resistance device the resistance of which periodically alternates in response to said control means between relatively low values and relatively high values at the same rate as, but in phase opposition to, said first time-varying resistance device, (E) an input terminal, (F) an output terminal, (G) a common terminal, (H) means for connecting said first time-varying resistance device and said time-varying capacitor in series across said input terminal and common terminal, (I) means for connecting one terminal of said second time-varying resistance device to said output terminal, (J) means for connecting the remaining terminal of said second time-varying resistance device to the junction of said time-varying capacitance device and said first time-varying resistance device, said interconnection being accomplished by connecting the output terminal of stage N to the input terminal of stage N+1, and connecting all of said common terminals together.

5. The circuit of claim 4 wherein alternate stages have one terminal of said time-variable capacitance device connected to said input terminal.

6. The circuit of claim 5 further comprising a feedback connection from the output of the last stage to the input of the first stage.

7. The circuit of claim 6 wherein adjoining elements of like kind in adjacent stages are coalesced.

References Cited

UNITED STATES PATENTS

| | | | |
|---|---|---|---|
| 2,795,648 | 6/1957 | Mason | 330—7 X |
| 2,997,659 | 8/1961 | Abbott et al. | 330—34 |
| 3,046,363 | 7/1962 | Reynolds. | |
| 3,070,751 | 12/1962 | Vigiano | 330—7 X |
| 3,119,080 | 1/1964 | Watters | 330—34 X |
| 3,134,949 | 5/1964 | Tiemann | 330—34 X |
| 3,172,048 | 3/1965 | Ohnsorge | 330—4.9 |

ROY LAKE, *Primary Examiner.*

NATHAN KAUFMAN, *Examiner.*